(12) United States Patent
Bond

(10) Patent No.: US 12,179,871 B2
(45) Date of Patent: Dec. 31, 2024

(54) BICYCLE SEAT DROP STOPPER

(71) Applicant: William Bond, Aurora, CO (US)

(72) Inventor: William Bond, Aurora, CO (US)

( * ) Notice: Subject to any disclaimer, the term of this patent is extended or adjusted under 35 U.S.C. 154(b) by 582 days.

(21) Appl. No.: 17/367,183

(22) Filed: Jul. 2, 2021

(65) Prior Publication Data

US 2022/0001947 A1 Jan. 6, 2022

Related U.S. Application Data

(60) Provisional application No. 63/047,851, filed on Jul. 2, 2020.

(51) Int. Cl.
*B62J 1/08* (2006.01)
(52) U.S. Cl.
CPC ............ *B62J 1/08* (2013.01); *B62J 2001/085* (2013.01)
(58) Field of Classification Search
CPC ....... B62J 1/08; B62J 2001/085; B62K 19/30; B62K 19/36; B62K 2206/00; B62K 19/02; B62K 19/40; B62K 3/06
USPC .......................................................... 188/67
See application file for complete search history.

(56) References Cited

U.S. PATENT DOCUMENTS

| 2006/0029465 | A1* | 2/2006 | Auer ..................... B62M 9/135 |
| | | | 403/383 |
| 2010/0199481 | A1* | 8/2010 | Petrie ......................... B62J 1/08 |
| | | | 29/428 |
| 2010/0254756 | A1* | 10/2010 | Chiang .................. B62K 19/36 |
| | | | 403/373 |
| 2017/0002855 | A1* | 1/2017 | Hermansen ............ B62M 25/04 |
| 2017/0217522 | A1* | 8/2017 | Cheng ...................... B62J 1/167 |
| 2019/0077478 | A1* | 3/2019 | Hu ........................... B62K 19/36 |

FOREIGN PATENT DOCUMENTS

| DE | 102013013988 A1 * | 2/2015 | ............... B62J 1/08 |
| GB | 2397050 A * | 7/2004 | ............. B62K 19/36 |

OTHER PUBLICATIONS

English machined translation of DE-102013013988. Feb. 26, 2015.*

* cited by examiner

*Primary Examiner* — Robert A. Siconolfi
*Assistant Examiner* — San M Aung
(74) *Attorney, Agent, or Firm* — Gutwein Law; Tyler B. Droste

(57) ABSTRACT

A detachable device configured for placement on a bicycle seat post to secure the post at a given low height position and generally configured to prevent a bicycle seat from dropping to a lowest point of travel while a rider is using an adjustable seat post, such as a dropper seat post. The device is generally provided from a first member and second member in a hinged coupling secured through a spring-loaded fastener for coupling to the seat post at a desired height.

16 Claims, 8 Drawing Sheets

BICYCLE SEAT DROP STOPPER

CROSS-REFERENCE TO RELATED APPLICATION

This U.S. patent application claims priority to U.S. Provisional Application No. 63/047,851 filed Jul. 2, 2020 to the above-named inventor, the disclosure of which is considered part of the disclosure of this application and is hereby incorporated by reference in their entirety.

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

The invention relates generally to a device configured to secure a bicycle seat at a dropped location. More particularly, this invention relates to a bicycle seat drop stopper generally installed upon a bicycle seat post.

BACKGROUND

In the cycling industry, there are many examples of bicycle seat post assemblies. These are generally configured to be adjustable to allow a user to adjust a bicycle seat height.

The seat position of a bicycle rider can be very important to the efficiency and the control of the bicycle the rider is operating. Within certain types of cycling activities, it can be advantageous to move the seat while riding as the rider encounters certain terrains or grades. One such solution to enable movement of the seat during riding is through the use of a device commonly referred to as a dropper seat post. A dropper seat post is generally a mechanical device that enables the rider to drop and raise the seat post along a given height of the seat post. In a typical assembly a user will activate the mechanism to drop the seat and reactivate the mechanism to secure the seat at a given height. This solution, although helpful, has some limitations wherein the seat is not always positioned at the desired location when dropped to a position between the highest position and the lowest position.

U.S. Pat. Nos. 7,422,224, 8,191,964, 9,073,592, 9,358,418, 10,787,215, 10,710,670 and 10,807,667 and U.S. Patent Application Publication Nos. 20190300088 and 20210001941 disclose adjustable bicycle seat post and/or dropper seat post assemblies generally comprising two cylindrical tubes, the two tubes connected to each other in a movable way, to allow for a user to adjust the seat height. Different mechanisms are disclosed, but there is still room for improvement regarding locking the bicycle seat into a desired location and preventing the seat to drop from the desired location to a lower location.

BRIEF SUMMARY OF THE INVENTION

It would be advantageous to have an apparatus that is configured as a detachable device configured for placement on a seat post to secure the post at a given low height position. Furthermore, it would also be advantageous to have an apparatus that is made of aluminum. Still further, it would be advantageous to have an apparatus that is spring-loaded for easy placement and attachment. Therefore, there currently exists a need in the market for an apparatus that prevents a bicycle seat from dropping to a lowest point of travel while a rider is using an adjustable seat post, such as a dropper seat post.

This disclosure advantageously fills the aforementioned deficiencies by providing a bicycle seat drop stopper, which provides a way for riders to keep their bike seats at their desired height.

This disclosure is generally fastened to the seat post through a spring-loaded fastener.

The apparatus has soft rubber lining on an inner portion to prevent damage and aid in securing the device to the seat post.

The apparatus has a hex screw fastener consistent with existing fastener types utilized on bicycles.

The apparatus fulfills the need for a bicycle seat drop stopper device configured to secure the seat at a desired height between a highest point and a lowest point.

Among other things, it is an advantage of this disclosure to provide a bicycle seat drop stopper that does not suffer from any of the problems or deficiencies associated with prior solutions.

It is still further an advantage of the invention to be made of anodized aluminum.

Still further, the apparatus can be provided in multiple color options.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1:
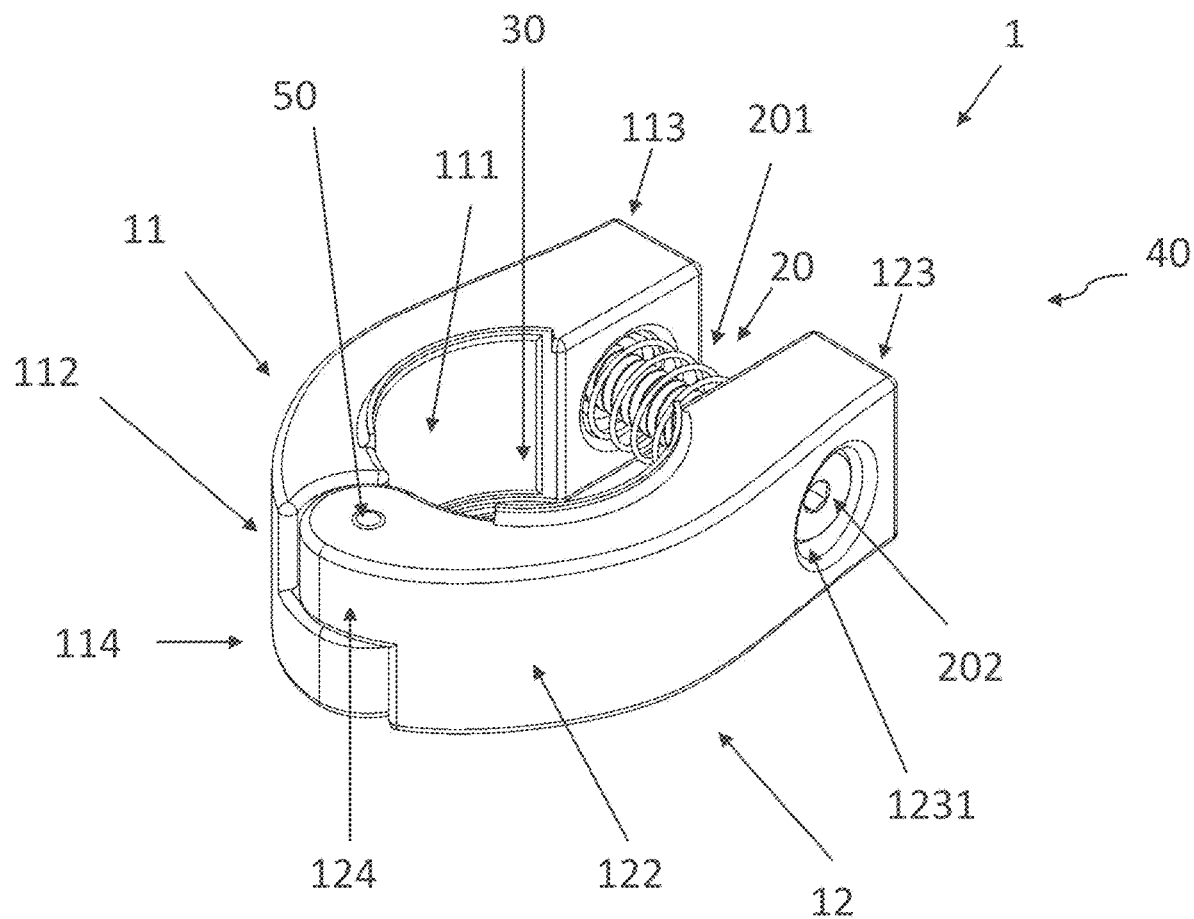
FIG. 1 is a perspective view of the device, according to the present disclosure.

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention of this disclosure is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit, or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful and is not intended to exclude other embodiments from the scope of the invention.

As used herein, the terms "front," "back," "rear," "upper," "lower," "right," and "left" in this description are merely used to identify the various elements as they are oriented in the FIGS, with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate members being attached to one another. Such joining may be permanent in nature or alternatively may be removable or releasable in nature. Similarly, coupled can refer to a two member or elements being in communicatively coupled, wherein the two elements may be electronically, through various means, such as a metallic wire, wireless network, optical fiber, or other medium and methods.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The invention can generically be described as a bicycle seat drop stopper.

More particularly the device of the present disclosure if preferably an aluminum device configured for placement on a bicycle seat post to prevent the seat post from dropping to a lowest point of travel when using an adjustable seat post, such as a dropper-style seat post.

Figure 2:
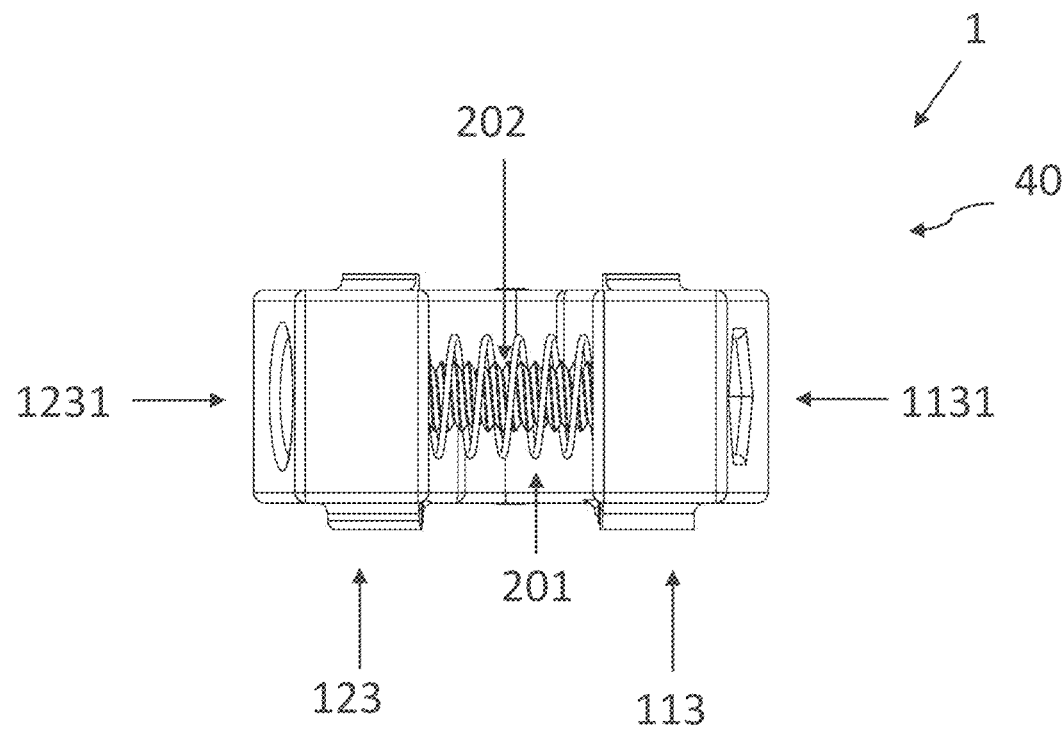
FIG. 2 is a view of the back of the device, according to the present disclosure.
Figure 3:
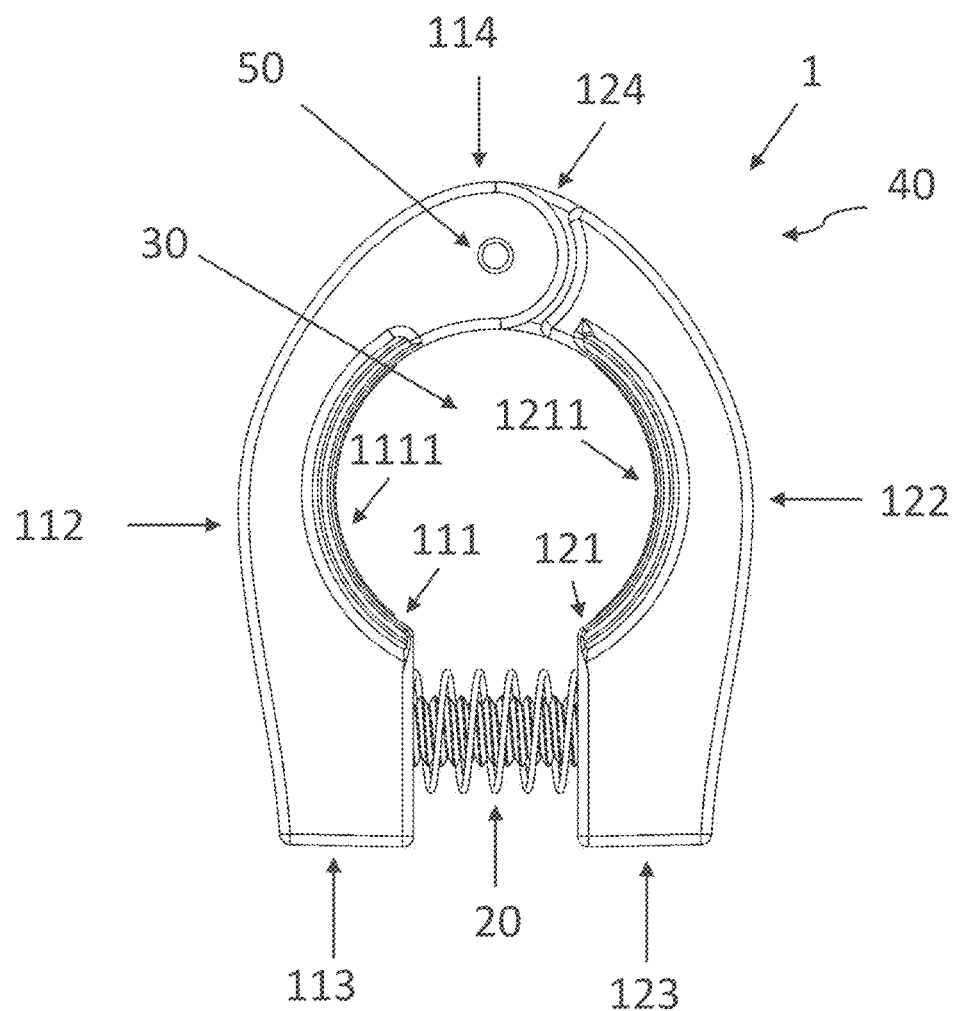
FIG. 3 is a view of the bottom of the device, according to the present disclosure.
Figure 4:
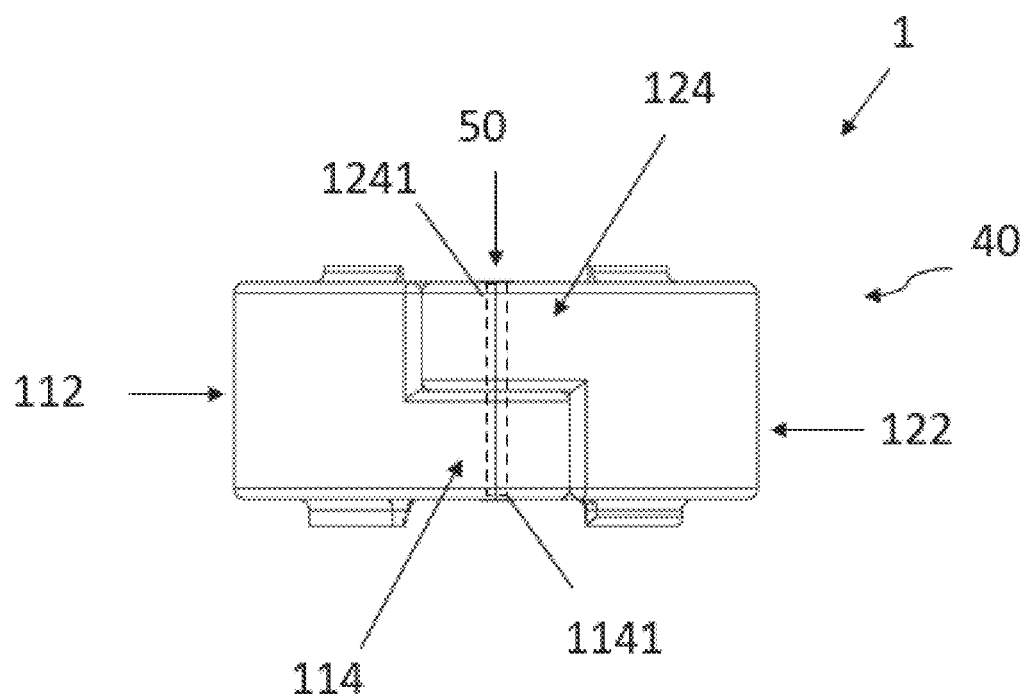
FIG. 4 is a view of the front of the device, according to the present disclosure.
Figure 5:
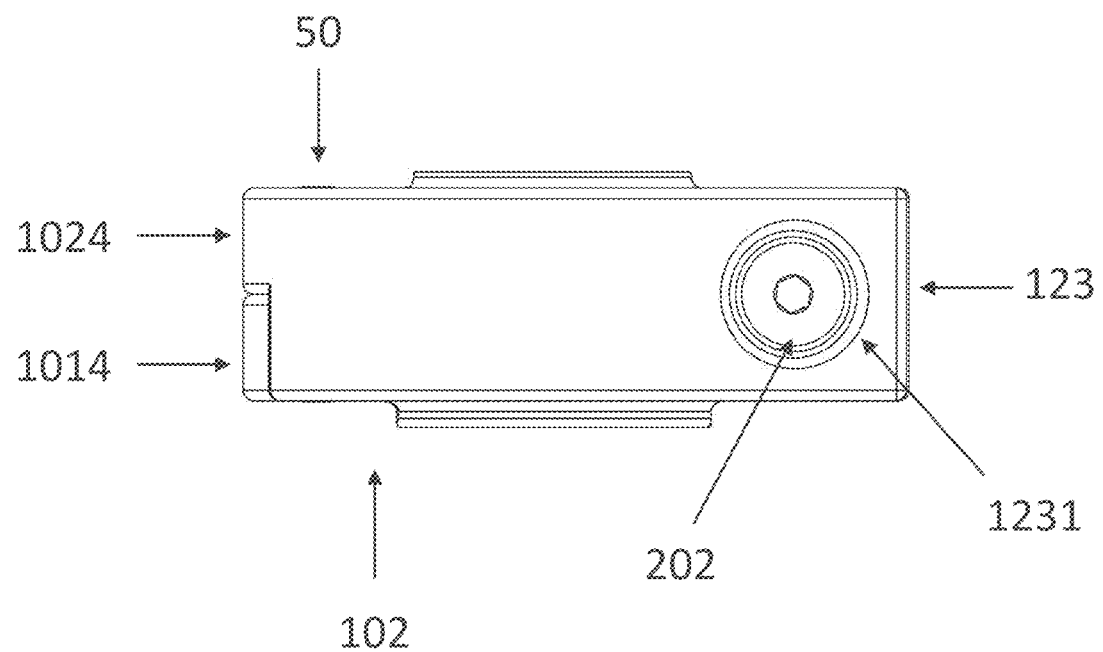
FIG. 5 is a view of the left side of the device, according to the present disclosure.
Figure 6:
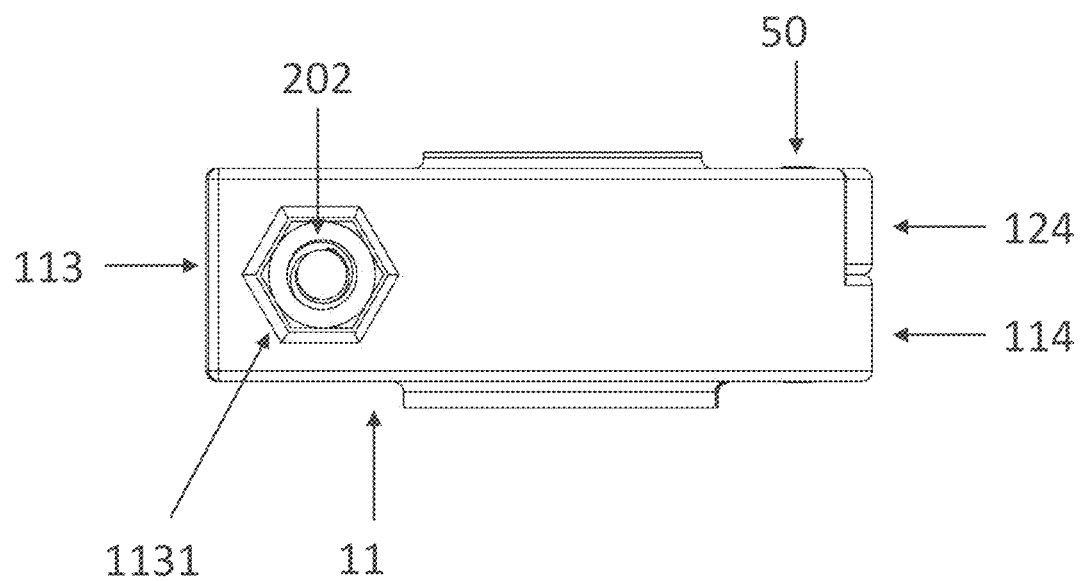
FIG. 6 is a view of the right side of the device, according to the present disclosure.
Figure 7:
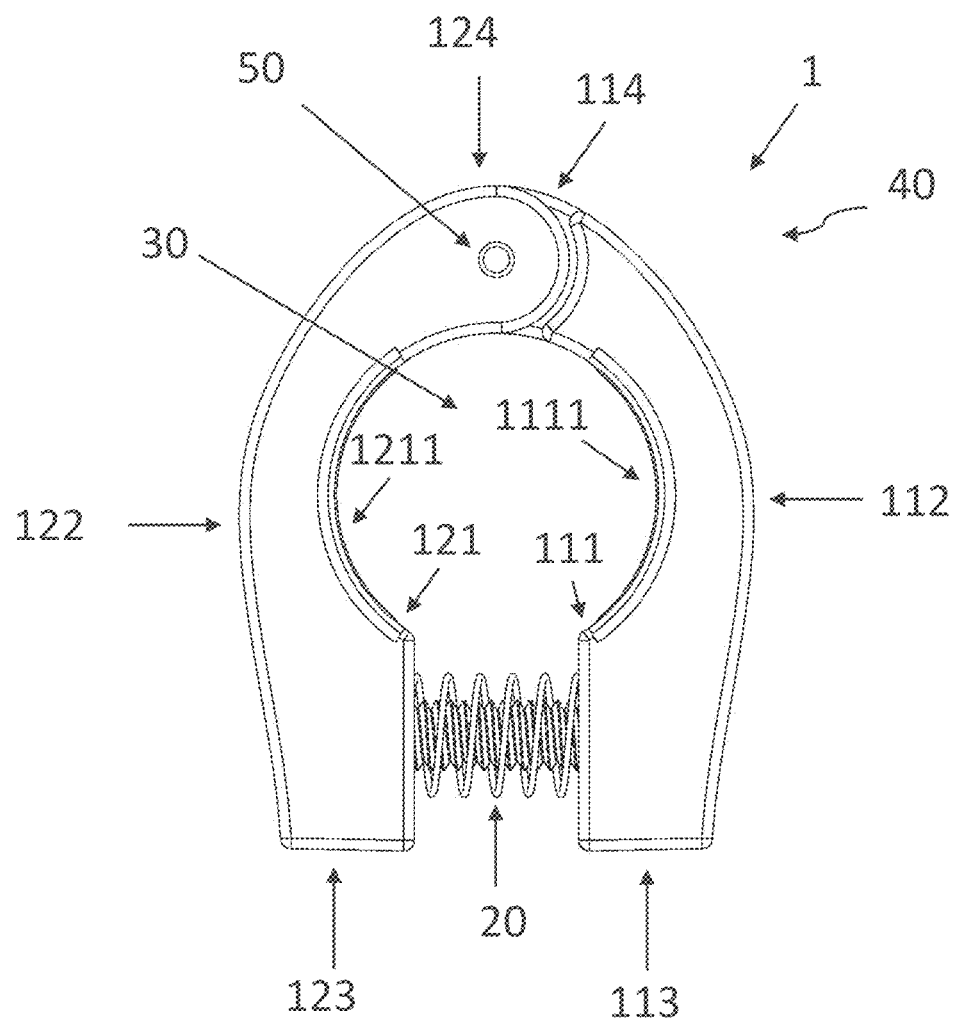
FIG. 7 is a view of the top of the device, according to the present disclosure.
Figure 8:
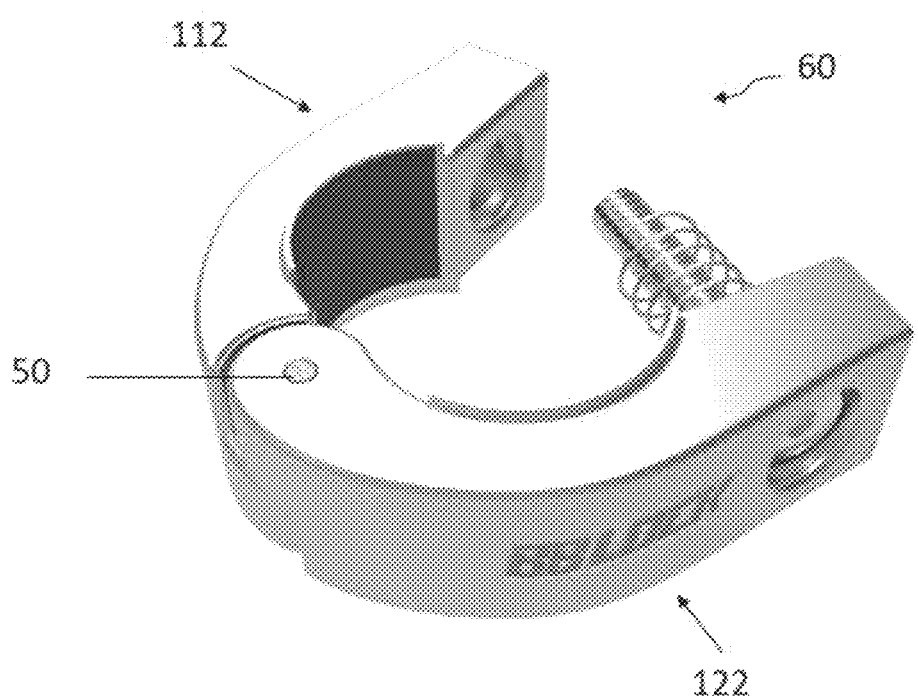
FIG. 8 is a perspective view of the device in an open position, according to the present disclosure.

Referring to the figures, FIG. 1 to FIG. 8 shows a bicycle seat drop stopper according to the present disclosure and generally referred to as device 1. The device 1 is generally configured for removable placement upon a bicycle seat post for generally stopping the seat from traveling to a lowest position, wherein a user may install the device 1 to stop the seat at a desired position of travel along a predetermined height of the seat post the device 1 is installed upon.

The device 1 includes a first member and a second member 11, 12 and a spring-loaded fastener 20. Each of the members 11, 12 having an interior surface 111, 121, an exterior surface 112, 122, a first end 113, 123 and a second end 114, 124. The device 1 is generally configured for placement and attachment upon a bicycle seat post, the two members 11, 12 define a generally circular cavity 30 for the receipt of the bicycle seat post the device 1 is installed upon, wherein the bicycle seat post is located within the void 30 during installation. The device 1 is secured through the spring-loaded fastener 20 around the bicycle seat post in a way that the device 1 functions as a bicycle seat drop stopper device, configured to secure the seat at a desired height between a highest point and a lowest point, preventing the bicycle seat from dropping to a lowest point of travel while a rider is using an adjustable seat post.

The device 1 is configured in an assembly with the two members 11, 12 hingedly coupled to allow the two members 11, 12 to move from an open position 60 to a fastened position 40. The device 1 is secured by fastening around a seat post though the spring-loaded fastener 20 to achieve the fastened position 40. The spring-loaded fastener 20 allows for the device 1 to be adjustable for fitment around various sizes of seat posts in an easy and secure way. It will be understood by one skilled in the art that the fastened position 40 will vary according to the size of diameter of the seat post the device 1 is installed upon.

In the preferred embodiment, the spring-loaded fastener 20 comprises a compression spring 201 and a fastener, preferably of the hex screw head 202 type, consistent with existing fastener types utilized on bicycles, wherein the hex screw head fastener 202 is located within the spring 201 at an interior of the spring. Preferably, the fastener 202 is threaded through holes 1131, 1231, securing the pair of members 11, 12 at the fastened position 40. The spring-loaded fastener 20 allows for an adjustable tension across a variety of seat post diameters and enables for an increase in the grip of the device 1 when installed.

In the preferred embodiment, each member 11, 12 of the pair of members 11, 12 are generally arcuate in shape and mirror images of each other, wherein the pair of members 11, 12 are coupled together in an assembly, and movable between an open position 60 and a fastened position 40, wherein the interior surfaces 111, 121 define an adjustable void 30 between the pair of members 11, 12. The void 30 generally configured to receive and secure a bicycle seat post.

Preferably, the spring-loaded fastener 20 is located at the first end 113, 123 and the pair of members 11, 12 are coupled together through a hinge pin 50 at the second end 114, 124. The hinge pin 50 inserted through holes 1141 and 1241, connecting the base members 11, 12 in a movable assembly. It will be understood by one skilled in the art that hinge pin 50 is generally selected to enable movement of the base members 11, 12 and may be a pin or other type of fasteners may be used to couple the base members 11, 12 in a movable assembly.

Preferably, the device 1 further comprises a soft rubber lining 1111, 1211 covering the interior surfaces 111, 121. The soft rubber lining provides grip and prevents the device 1 and the seat post from scratches and marring.

Preferably, the device 1 is constructed from anodized aluminum and provided in a multitude of colors.

The device 1 is most generally easily detached and replaced to a new position upon the seat post based upon user preference.

While the invention has been described above in terms of specific embodiments, it is to be understood that the invention is not limited to these disclosed embodiments.

Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A bicycle seat drop stopping device, comprising:
   a first member, a second member, each of the first member and the second member having an interior surface, an exterior surface, a first end and a second end, the second end of the first member and the second end of the second member hingedly couplable to each other; and
   a spring-loaded fastener comprising a compression spring having an interior and a screw within the interior, the spring-loaded fastener capable of providing an adjustable spring-force, the compression spring of the spring-loaded fastener is positioned between the first end of the first member and the first end of the second member, opposite the hingedly couplable second end of the first member and the second end of the second member;
   wherein the stopping device is configured for placement upon a bicycle seat post in a way that the stopper device restricts movement of the seat at a desired height between a highest point and a lowest point for generally stopping the seat from traveling to a lowest position.

2. The bicycle seat drop stopping device of claim 1, wherein the spring-loaded fastener is located at the first end of each of the two members and the two members are hinged coupled at the second end, to allow the two members to move from an open position to a fastened position.

3. The bicycle seat drop stopping device of claim 2, wherein the spring-loaded fastener secures the two members around the bicycle seat post in the fastened position.

4. The bicycle seat drop stopping device of claim 3, wherein the two members define a void, wherein the bicycle seat post is located within the void.

5. The bicycle seat drop stopping device of claim 4, wherein the spring-loaded fastener allows for the device to be adjusted around various sizes of seat posts.

6. The bicycle seat drop stopping device of claim 1, wherein the spring-loaded fastener, wherein the first end of the first member has a hole and the first end of the second member has a hole, wherein the spring loaded fastener is configured to couple to the first end of the first member and the second end of the second member and move the device from a first position to a second position.

7. The bicycle seat drop stopping device of claim 1, wherein the two members are arcuate in shape and mirror images of each other.

8. The bicycle seat drop stopping device of claim 7, wherein the two members are coupled together in a hinged assembly with the spring-loaded fastener positioned opposite the hingedly coupled second ends, wherein each of the interior surfaces define a void between the pair of members, the void configured to adjustably receive and secure various sizes of bicycle seat posts.

9. The bicycle seat drop stopping device of claim 8, wherein each of the interior surfaces further comprise a soft rubber lining.

10. The bicycle seat drop stopping device of claim 1, wherein the device is constructed from anodized aluminum.

11. A bicycle seat drop stopper device configured for removable attachment to a bicycle seat post, the drop stopper device comprising:
    a first member, the first member having an interior surface, an exterior surface, a first end, and a second end;
    a second member, the second member having an interior surface, an exterior surface, a first end and a second end, the second member hingedly coupled at the second end with the second end of the first member, the first member and the second member coupling movable from an open position to a fastened position; and
    a spring-loaded fastener, the spring-loaded fastener at least comprising a compression spring having an interior and a screw within the interior, and the compression spring positioned between the first end of the first member and the first end of the second member, wherein the spring-loaded fastener connects the first member and the second member opposite the hingedly couplable second ends in the fastened position;
    wherein the spring-loaded fastener allows for the device to be adjusted around various sizes of seat posts.

12. The bicycle seat drop stopper device of claim 11, wherein each of the interior surfaces of the first member and the second member define a void between the pair of members, the void configured to receive and secure the bicycle seat post.

13. The bicycle seat drop stopper device of claim 12, wherein the first member and the second member are arcuate in shape and mirror images of each other.

14. The bicycle seat drop stopper device of claim 13, wherein each of the interior surfaces further comprise a soft rubber lining.

15. The bicycle seat drop stopper of claim 14, wherein the device is construed from anodized aluminum.

16. The bicycle seat drop stopper of claim 12, wherein the first end of the first member has a hole and the first end of the second member has a hole, wherein the spring loaded fastener is configured to couple to the first end of the first member and the second end of the second member.

\* \* \* \* \*